(12) United States Patent
Cadet et al.

(10) Patent No.: US 10,448,793 B2
(45) Date of Patent: Oct. 22, 2019

(54) DRY WIPE WITH DEMISTING AND/OR CLEANING ACTION

(71) Applicant: SATISLOH AG, Baar (CH)

(72) Inventors: Mamonjy Cadet, Charenton-le-Pont (FR); Annette Cretier, Charenton-le-Pont (FR)

(73) Assignee: SATISLOH AG, Baar (CH)

( * ) Notice: Subject to any disclaimer, the term of this patent is extended or adjusted under 35 U.S.C. 154(b) by 180 days.

(21) Appl. No.: 14/761,864

(22) PCT Filed: Jan. 17, 2014

(86) PCT No.: PCT/EP2014/050887
§ 371 (c)(1),
(2) Date: Jul. 17, 2015

(87) PCT Pub. No.: WO2014/111513
PCT Pub. Date: Jul. 24, 2014

(65) Prior Publication Data
US 2015/0366421 A1    Dec. 24, 2015

(30) Foreign Application Priority Data

Jan. 18, 2013 (FR) ..................... 13 50459

(51) Int. Cl.
*A47L 1/15* (2006.01)
*C11D 3/00* (2006.01)
(Continued)

(52) U.S. Cl.
CPC ............... *A47L 1/15* (2013.01); *A47L 13/17* (2013.01); *B05D 1/02* (2013.01); *C11D 1/66* (2013.01);
(Continued)

(58) Field of Classification Search
None
See application file for complete search history.

(56) References Cited

U.S. PATENT DOCUMENTS

2002/0192407 A1* 12/2002 Hendrix ............... A61K 8/0208
428/34.3
2005/0113277 A1   5/2005 Sherry et al.
(Continued)

FOREIGN PATENT DOCUMENTS

JP    H01-314546    12/1989
JP    H07-289490    11/1995
(Continued)

OTHER PUBLICATIONS

Office Action issued in Japanese Patent Application No. 2015-553092, dated Oct. 3, 2017 (English Translation).

*Primary Examiner* — Shamim Ahmed
*Assistant Examiner* — Bradford M Gates
(74) *Attorney, Agent, or Firm* — Norton Rose Fulbright US LLP

(57) ABSTRACT

The present invention relates to a dry wipe comprising a woven or knitted microfiber fabric having hydrophilic polymer microfibers and lipophilic polymer microfibers, which is impregnated with at least one surfactant, the hydrophilic/lipophilic balance (HLB) of which is greater than or equal to 5. These wipes can be used to clean the surface of substrates and/or to confer demisting properties on hydrophilic surfaces.

29 Claims, 1 Drawing Sheet

Figure 1:
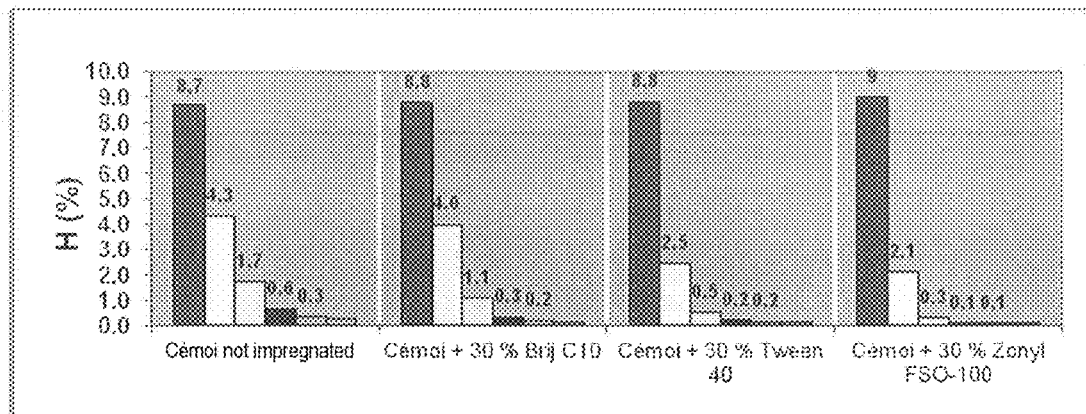

(51) Int. Cl.
  *C11D 11/00* (2006.01)
  *C11D 17/04* (2006.01)
  *G02C 13/00* (2006.01)
  *G02B 27/00* (2006.01)
  *A47L 13/17* (2006.01)
  *B05D 1/02* (2006.01)
  *C11D 1/66* (2006.01)

(52) U.S. Cl.
  CPC ........ *C11D 3/0078* (2013.01); *C11D 11/0029* (2013.01); *C11D 17/049* (2013.01); *G02B 27/0006* (2013.01); *G02C 13/006* (2013.01)

(56) References Cited

U.S. PATENT DOCUMENTS

| | | | |
|---|---|---|---|
| 2009/0000050 A1* | 1/2009 | Kizuka | A47L 13/16 15/209.1 |
| 2009/0155327 A1* | 6/2009 | Martin | A47L 13/16 424/404 |
| 2010/0112325 A1 | 5/2010 | Iwamoto et al. | |
| 2012/0019767 A1* | 1/2012 | Cadet | C03C 17/30 351/62 |

FOREIGN PATENT DOCUMENTS

| | | |
|---|---|---|
| JP | 2004-501701 | 1/2004 |
| JP | 2004317539 A * | 11/2004 |
| JP | 2007-532939 | 11/2007 |
| JP | 2009195648 | 9/2009 |
| WO | WO2002/000819 | 1/2002 |
| WO | WO2005/108543 | 11/2005 |
| WO | WO 2008/130015 | 10/2008 |
| WO | WO2011/080472 | 7/2011 |
| WO | WO2013/013929 | 1/2013 |

* cited by examiner

DRY WIPE WITH DEMISTING AND/OR CLEANING ACTION

CROSS-REFERENCE TO RELATED APPLICATIONS

This application is a national phase application under 35 U.S.C. § 371 of International Application No. PCT/EP2014/050887 filed 17 Jan. 2014, which claims priority to French Application No. 1350459 filed 18 Jan. 2013. The entire contents of each of the above-referenced disclosures is specifically incorporated herein by reference without disclaimer.

The present invention relates to dry wipes obtained by the impregnation of a microfiber fabric by a surfactant compound, which are capable of giving a surface anti-fog properties by simple wiping of said surface, via a transfer of said surfactant to the wiped surface. These wipes also impart a cleaning action with respect to the treated surface.

Numerous supports, such as plastics and glass, exhibit the disadvantage of fogging up when the temperature of their surface falls below the dew point of the ambient air, by condensation of miniscule water droplets on this support. This is the case in particular with glass that is used to form glazings for transportation vehicles or buildings, spectacle lenses, lenses, mirrors, camera optics, etc. The formation of fog on these surfaces leads to a decrease in the transparency, due to the scattering of light by the water drops, which can cause significant nuisance, in particular in situations where excellent visibility is essential.

In order to avoid the formation of fog in a very humid environment, it has been proposed to deposit, on the outer surface of the support on which it is sought to eliminate the occurrence of the appearance of fog, hydrophilic polymer coatings having a low static contact angle with water that make it possible to facilitate the wetting of the outer surface by the water, so as to form a very thin continuous film of water that gives an impression of transparency.

These so-called permanent anti-fog coatings generally consist of very hydrophilic species such as sulfonates or polyurethanes. The expression "permanent anti-fog coating" is understood to mean a coating for which the anti-fog properties derive from hydrophilic compounds permanently bonded to the support, and do not require treatments with anti-fog agents at regular intervals in order to regenerate the anti-fog effect.

The commercial products corresponding to these permanent anti-fog glasses generally comprise hydrophilic layers having a thickness of several micrometers. On the one hand the transparency of these products is adversely affected by such a hydrophilic layer, on the other hand these thick coatings, owing to the absorption of water, swell, soften and become less mechanically resistant. Furthermore, a deterioration of the anti-fog properties is gradually observed due in particular to contamination by dust, finger marks or other fatty substances. This makes it necessary to clean the treated surfaces relatively frequently in order to restore the anti-fog properties.

Temporary anti-fog properties may also be obtained by applying, to supports such as spectacle lenses, commercial aqueous or alcoholic hydrophilic solutions containing one or more anti-fog agents (generally surfactants), available in the form of sprays or wipes which have been preimpregnated. They make it possible to obtain anti-fog properties over a short period of time by simple spraying or wiping of the surface to be treated.

These formulations may be applied to substrates comprising, as outer layer, a (hydrophobic and/or oleophobic) anti-soiling coating, often considered to be essential in the case where the substrate is an ophthalmic lens having an antireflection coating. The spectacle lenses thus treated have poor anti-fog properties.

These formulations may be applied more advantageously to the surface of substrates comprising, as outer layer, a hydrophilic coating that is precursor of an anti-fog coating, so as to form a temporary anti-fog coating.

International patent application WO 2011/080472, in the name of the applicant, describes a spectacle lens comprising a substrate coated with a coating comprising, at its surface, silanol groups and, in direct contact with this coating, a precursor coating of an anti-fog coating which:
- is obtained by grafting at least one organosilane compound having a polyoxyalkylene group comprising less than 80 carbon atoms, and at least one silicon atom bearing at least one hydrolyzable group,
- has a thickness generally of less than or equal to 5 nm, and
- has a static contact angle with water of greater than 10° and less than 50°.

Patent application WO 2013/013929, in the name of the applicant, describes a temporary anti-fog coating, obtained by application to the surface of the precursor coating of a film of a surfactant composition containing at least one surfactant corresponding to the formula $F(CF_2)_y$—$(CH_2CH_2O)$—$(CH_2$—$CH_2O)_xH$ (VIII) in which x is an integer varying from 1 to 14, y is an integer less than or equal to 10, the compounds of formula (VIII) for which y=6 representing at least 90% by weight of the compounds of formula (VIII) present in the composition. The composition is applied directly in liquid form to the precursor coating or by means of dry or wet wipes comprising said composition.

It is known to use wet wipes impregnated with a liquid solution of surfactant for anti-fog use. The drawback of wet wipes is that reuse thereof is limited and that they must be kept in leak tight packaging.

International application WO 2005/108543 describes reusable anti-fog wipes that are dry, i.e. that feel dry to the touch, comprising a textile surface impregnated with 10% to 35% by weight of various liquid surfactants. The textile may be made of synthetic or natural fibers or of microfibers.

Application JP 2009/195648 describes a dry anti-fog textile that is nonwoven and
1) is impregnated with a solution containing a mixture of a cationic fluorinated surfactant and a nonionic fluorinated surfactant;
2) that contains split fibers and non-split fibers, the split fibers preferably being microfibers.

Besides its anti-fog properties, this nonwoven specific textile, impregnated with the above surfactant composition, is described as exerting an additional cleaning action for a glass having, at the surface, a fluorinated hydrophobic material. Document JP 2009/195648 indicates that the impregnated nonwoven textile is capable of removing drops of water if they are present at the surface of spectacle lenses.

The performances of this textile are capable of being improved.

The present invention proposes to provide solutions to the technical problems known in the field of the anti-fog treatment or cleaning of substrates, which are generally transparent or reflective substrates.

Thus, one objective of the invention is to provide a reusable wipe capable of preventing the formation of fog on a transparent or reflective surface, preferably an optical article, in particular an ophthalmic lens. This wipe must impart anti-fog properties, the persistence of which over time is high, properties which must be obtained rapidly, that is to say by means of a small number of applications of the anti-fog agent at the surface of the article, without leading to a deterioration of the visibility.

Another objective of the invention is to provide a reusable wipe having improved properties relative to existing wipes for cleaning soiling, in particular sebum-type soiling.

The above two objectives may be achieved separately or in combination by means of a dry wipe comprising a woven or knitted microfiber fabric comprising hydrophilic polymer microfibers and lipophilic polymer microfibers, impregnated with at least one surfactant having a hydrophilic-lipophilic balance (HLB)≥5, the wipe not comprising a dry microfiber fabric obtained by i) impregnation of a microfiber fabric comprising microfibers made of polymers or of mixtures of polymers comprising polyester units and polyamide units, with a surfactant composition containing at least one surfactant of formula $F(CF_2)_y-(CH_2-CH_2O)_{x+1}H$ (VIII), in which x is an integer varying from 1 to 14, y is an integer less than or equal to 10, the compounds of formula (VIII) for which y=6 representing at least 90% by weight of the compounds of formula (VIII) present in the composition, then ii) drying of this microfiber fabric, and the wipe not comprising a dry microfiber fabric obtained by i) impregnation of a microfiber fabric comprising microfibers made of polymers or of mixtures of polymers comprising polyester units and polyamide units, with a surfactant composition containing at least one surfactant of formula $F(CF_2)_y-(CH_2-CH_2O)_{x+1}H$ (VIII), in which x is an integer varying from 2 to 14, y is an integer less than or equal to 10, the compounds of formula (VIII) for which y=6 representing at least 90% by weight of the compounds of formula (VIII) present in the composition, then ii) drying of this microfiber fabric.

Figure 2:
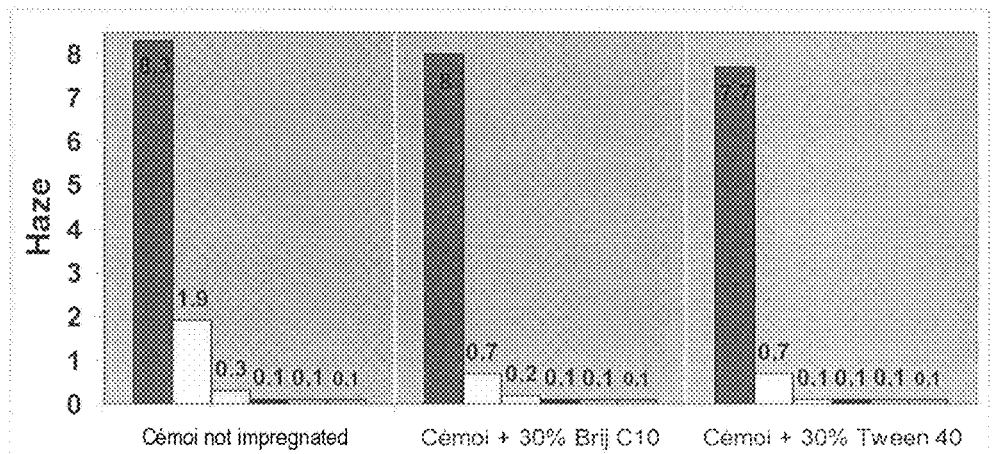
Figure 3:
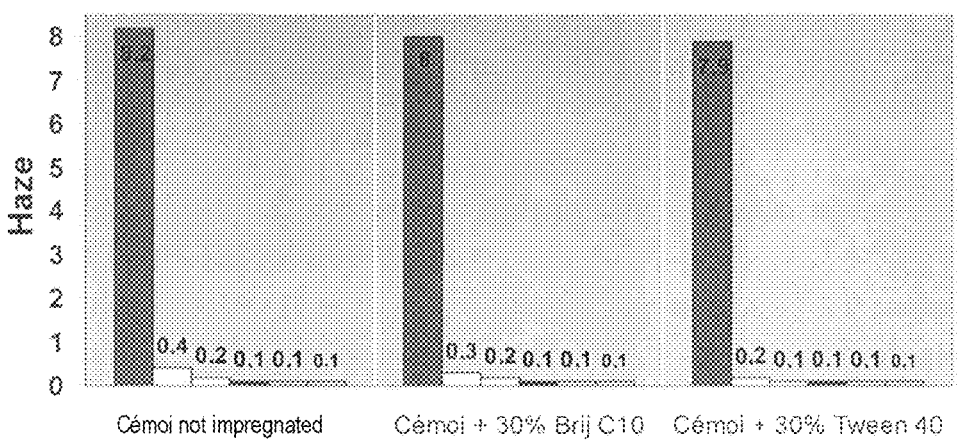

The invention will be described in greater detail with reference to the appended drawings, in which FIGS. 1 to 3 present the wiping performances on various hydrophilic or hydrophobic surfaces of wipes according to the invention, consisting of Cémoi™ fabric impregnated with surfactants.

The surfactant used for impregnating the wipe according to the invention imperatively has a hydrophilic-lipophilic balance (HLB)≥5, which is preferably less than or equal to 18, better still less than or equal to 16, and even better still less than or equal to 15, so as to benefit from optimal anti-fog properties. The expression "hydrophilic-lipophilic balance (HLB)" is well known to a person skilled in the art and represents a characteristic quantity of a surfactant, which is greater when the water solubility of the surfactant is high. In the present application, the theoretical (calculated) value of the hydrophilic-lipophilic balance will be taken into account.

For nonionic surfactants, use will be made of the calculation method defined in the publication by W. C. Griffin, J. Soc. Cosm. Chem. 1954 (Vol. 5), pages 249-256, namely HLB=20×Mh/M, in which formula Mh is the molecular weight of the hydrophilic portion of the molecule and M is the total molecular weight of the molecule giving a result on a scale of 0 to 20. An HLB value of 0 calculated according to the Griffin method corresponds to a completely lipophilic/hydrophobic molecule, and a value of 20 corresponds to a completely hydrophilic/lipophobic molecule.

For anionic surfactants, use will be made of the calculation method defined in the publication by Davies, J. T., "A Quantitative Kinetic Theory of Emulsion type. I. Physical Chemistry of the Emulsifying Agent." Gas/Liquid and Liquid/Liquid Interfaces. Proceedings of the International Congress of Surface Activity (1957) 426-438, namely HLB=7+m×Hh−n×Hl, in which formula m denotes the number of hydrophilic groups in the molecule, Hh the value of the hydrophilic groups, n the number of lipophilic groups in the molecule, Hl the value of the hydrophilic groups.

For cationic surfactants, use will be made of the method defined in the publication by Z. E. Proverbio, S. M. Bardavid, E. L. Arancibia, P. C. Schulz, "Hydrophile-lipophile balance and solubility parameter of cationic surfactants" Colloids and Surfaces A: Physicochem. Eng. Aspects 214 (2003) 167-171.

Within the context of the invention, the surfactant used, which may in particular fulfill the role of anti-fog agent, may be a cationic, anionic, nonionic or amphoteric surfactant, preferably a nonionic surfactant.

The surfactant is preferably a liquid surfactant, by which term is meant a surfactant having a melting point below 35° C. under atmospheric pressure.

Preferably, it does not have too pronounced an evaporation phenomenon, or an unpleasant odor, does not give the wipe a greasy feel or modify its appearance in an unfavorable manner, does not generate optical or cosmetic defects on the surface treated, and is not toxic, given that the wipes of the invention are generally handled with bare hands and/or in the vicinity of the eye, especially in the case where they are intended for treating an optical surface such as the surface of a spectacle lens.

It preferably comprises a polyoxyalkylene group preferably having more than 6 oxyalkylene units, better still a polyoxyethylene group ideally having more than 6 oxyethylene units.

Polyethylene glycol alkyl monoethers (A) represent a first category of preferred surfactants. They are preferably not fluorinated. Among these, use will preferably be made of those of formula:

$$H(OCH_2CH_2)_nOR^1 \qquad (II)$$

in which $R^1$ is a linear or branched alkyl group, optionally substituted by one or more functional groups, and that may additionally comprise one or more double bonds, and n is an integer from 1 to 25, preferably from 2 to 20, better still from 2 to 15, even better still from 4 to 15 and ideally from 8 to 12. n may in particular take the values 2, 4, 5, 10 or 20. According to one particular embodiment, n is greater than 6. According to another particular embodiment, n is less than 20, better still less than 15.

$R^1$ is preferably a linear alkyl group preferably comprising 10 to 20 carbon atoms, better still a saturated linear alkyl group. Nonlimiting examples of $R^1$ groups that can be used are the dodecyl ($C_{12}H_{25}$), cetyl ($C_{16}H_{33}$), stearyl ($C_{18}H_{37}$) and oleyl ($C_{18}H_{35}$) groups. According to one particular embodiment, the $R^1$ group has 12 carbon atoms or fewer.

The surfactants of formula (II) preferably have a molar mass of from 180 to 1500 g/mol, better still from 300 to 1000 g/mol and even better still from 350 to 800 g/mol.

Compounds of formula (II) that can be used in the present invention are sold by Croda under the Brij® brand, for example the Brij® products bearing the following numbers: C10, L4, C20, S10. Among them, Brij® C10 (HLB=12-13) is preferred (compound of formula II with n=10 and $R^1$=n-$C_6H_{13}$).

The surfactants having a sorbitan ring (B) represent a second category of preferred surfactants. Among these, use will preferably be made of those for which the sorbitan ring has n of its four hydroxyl groups functionalized with identical or different OH-terminated polyoxyalkylene groups (preferably polyoxyethylene groups), and p of its four hydroxyl groups functionalized with identical or different $R^1$ groups of formula: $-(R_dO)_z-(Y)_{n2}-R'$ in which $R_d$ is a linear or branched alkylene group, z is an integer 1, Y is a divalent group, n2 represents 0 or 1 (preferably, n2=1) and R' is a saturated hydrocarbon group having from 12 to 19, preferably from 13 to 19, carbon atoms, n and p being integers such as n=2 or 3 and p=1 or 2, with n+p=4. Preferably, n=3 and/or p=1.

$R_d$ preferably represents a C2-C6 alkylene group such as the propylene or ethylene groups, ideally the ethylene group.

The integer z preferably varies from 1 to 40, better still from 2 to 20 and even better still from 2 to 10.

The OH-terminated polyoxyalkylene groups of these compounds preferably comprise from 1 to 40 oxyalkylene groups, better still from 2 to 20 and even better still from 2 to 10 oxyalkylene groups.

The total number of oxyalkylene groups present in the structure of the surfactants (B) preferably varies from 4 to 40, better still from 8 to 30, even better still from 15 to 25, and is ideally equal to 20.

R' is a saturated hydrocarbon group having preferably from 14 to 18 carbon atoms, better still from 15 to 17 carbon atoms. R' is preferably a linear alkyl group. R' is preferably an $n-C_{15}H_{31}$ or $n-C_{17}H_{35}$ group.

Nonlimiting examples of Y groups are alkylene, cycloalkylene, arylene, carbonyl and amido groups, or combinations of these groups, which are linear or branched, and optionally substituted. Y is preferably a carbonyl group.

The $-(Y)_{n2}-R'$ group is preferably a palmityl group or a stearyl group.

The surfactants (B) are preferably nonionic and are preferably polyoxyalkylene sorbitan fatty acid esters, i.e. polyoxyalkylenated sorbitans esterified once or twice by a fatty acid (Y=carbonyl and n2=1), preferably only once. Better still, the surfactants (B) are polyoxyethylene sorbitan fatty acid esters (Y=carbonyl, n2=1 and $R=CH_2CH_2$), in other words polysorbates with specific chain lengths for the ester group.

A preferred class of surfactants (B) comprises the compounds of formula (IX):

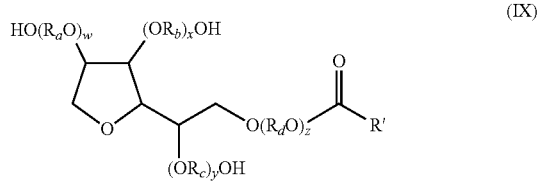

in which $R_a$, $R_b$, $R_c$ and $R_d$ independently represent linear or branched, preferably linear, alkylene groups, preferably C2-C6 alkylene groups such as the propylene or ethylene groups, w, x, y and z independently represent integers 1, preferably ranging from 1 to 40, better still from 2 to 20, even better still from 2 to 10, and R' is as defined above.

Preferably, w+x+y+z varies from 4 to 40, better still from 8 to 30 and even better still from 15 to 25. Ideally, w+x+y+z=20.

Among the surfactants (B) of formula (IX), use will preferably be made of the polyethoxylated compounds of formula (X):

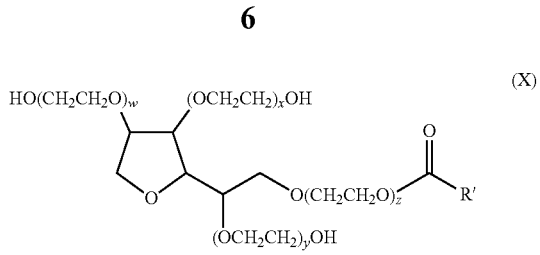

in which w, x, y, z and R' are as defined above.

The surfactants (B) may be easily synthesized or are commercially available. In particular, the surfactants (B) of formula IX or X are sold under the Alkest™, Canarcel™ or Tween™ brands.

The preferred surfactants (B) are Tween™ 40 (HLB=15.6), also known under the name of polyoxyethylene (20) sorbitan monopalmitate (compound of formula X in which $R'=C_{15}H_{31}$ and w+x+y+z=20), Tween™ 60, also known under the name of polyoxyethylene (20) sorbitan monostearate (compound of formula X in which $R'=C_{17}H_{35}$ and w+x+y+z=20), Tween™ 20 and Tween™ 80.

Other usable surfactants are the triblock copolymers comprising two ethylene oxide (EO) blocks and one propylene oxide (PPO) central block, referred to as "poloxamers", sold in particular by BASF under the name Pluronic®, and denoted by $(EO)_x-(PO)_y-(EO)_z$ or $HO(CH_2CH_2O)_x-(CH_2CH(CH_3)O)_y-(CH_2CH_2O)_zH$, for example the Pluronic® P-123, L-121, P-65 and P-64 products.

Other usable surfactants according to the invention are the polyethoxylated surfactants of fluoroalkyl nature, preferably of formula $F(CF_2)_y-(CH_2-CH_2O)_{x+1}H$ (VIII), in which x and y are integers such that x varies from 1 to 16 and y is less than or equal to 10.

Among these fluorinated surfactants, use may in particular be made of Capstone® FS 3100, Capstone® FS30, Capstone® FS 31, Capstone® FS 34, Masurf FS 1700, Masurf FS 1800, Masurf 2800, Masurf 2900, Zonyl® FSO 100 and Zonyl® FSN 100.

Capstone® FS 3100 is a surfactant comprising a mixture of compounds having variable polyethoxylated chain lengths corresponding to the general formula $F(CF_2)_y-(CH_2-CH_2O)_{x+1}H$ (VIII), more than 90% by weight of which corresponds to the fraction y=6, x being an integer varying from 1 to 14. Capstone® FS3100 contains contents of compound of formula (VIII) in which y is greater than 6 that are undetectable by HPLC. It is biodegradable.

Zonyl® FSO 100 (HLB=9.1), sold by Dupont, is a mixture of compounds of formula $F(CF_2)_y-(CH_2-CH_2O)_{x+1}H$ (VIII) in which y takes the values 6, 8 and 10 in respective weight proportions of the order of 65%, 30% and 5% and x is an integer varying from 2 to 13.

According to one embodiment, the surfactant used for impregnating the fabric contains at least one Si—O siloxane unit and also has a surface tension of less than 40 mN/m, better still less than 35 mN/m. An example of such a surfactant is the compound Coatosil 77 sold by Momentive (formerly Silwet 77, having a surface tension of 20.5 mN/m), the formula of which is the following, n being equal to 7.5:

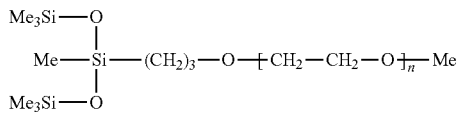

The surface tension of the surfactant expressed in mN/m is obtained according to the Wilhelmy plate method: the surface tension is measured for a 0.1 wt % solution (solvent: water). A vertical plate is pulled out of the liquid while measuring the force exerted. The value of the pull force of the plate is noted just before the meniscus detaches. The force thus obtained is divided by the width of the plate, and the value of the surface tension is obtained. The contact angle (0°) between the liquid and the surface of the plate must be guaranteed by intensive cleaning, for example by calcination of the measurement body.

According to one embodiment, the surfactant used is not of polysiloxane (silicone) nature.

The surfactants envisaged above may be used alone or as a mixture with one or more other surfactants, as long as the characteristics of the mixture in question remain compatible with the required properties of the wipes according to the invention. Preferably, the surfactants having a hydrophilic-lipophilic balance <5 represent less than 10% of the weight of surfactants impregnating the microfiber fabric, better still less than 5% and even better still 0%. Preferably, the surfactants having a hydrophilic-lipophilic balance >18 represent less than 10% of the weight of surfactants impregnating the microfiber fabric, better still less than 5% and even better still 0%.

Examples of surfactants that do not have a hydrophilic-lipophilic balance (HLB)≥5 are Brij S2, Brij 93 and Pluronic L-81.

The wipe according to the invention preferably comprises from 5% to 40% by weight of impregnated surfactants relative to the weight of the non-impregnated microfiber fabric, preferably from 10% to 40% by weight, better still from 15% to 35% by weight, even better still from 20% to 35% by weight, and optimally from 20% to 30% by weight.

The anti-fog and/or cleaning performances of the wipes according to the present invention also depend on the nature of the fabric or textile forming said wipe. Thus, the fabric should advantageously have a high absorbency which may be reflected by a high strand specific surface area by weight, in order to guarantee in particular a good wiping quality, and therefore a small mean diameter of the strands. In addition, the more absorbent the fabric, the greater the amount of anti-fog agent impregnated and the more long-lasting the anti-fog performance.

Preferably, the surfactants of formula $F(CF_2)_y$—$(CH_2$—$CH_2O)_{x+1}H$ (VIII), in which x is an integer varying from 1 to 14, y is an integer less than or equal to 10, the compounds of formula (VIII) for which y=6 representing at least 90% by weight of the compounds of formula (VIII) present, represent less than 10% of the weight of surfactants impregnating the microfiber fabric, better still less than 5% and even better still 0%. Preferably, the surfactants of formula $F(CF_2)_y$—$(CH_2$—$CH_2O)_{x+1}H$ (VIII), in which x is an integer varying from 2 to 14, y is an integer less than or equal to 10, the compounds of formula (VIII) for which y=6 representing at least 90% by weight of the compounds of formula (VIII) present, represent less than 10% of the weight of surfactants impregnating the microfiber fabric, better still less than 5% and even better still 0%. According to one embodiment of the invention, the fluorinated surfactants represent less than 10% of the weight of surfactants impregnating the microfiber fabric, better still less than 5% and even better still 0%.

According to another embodiment of the invention, the surfactants of formula $F(CF_2)_y$—$(CH_2$—$CH_2O)_{x+1}H$ (VIII), in which x is an integer varying from 1 to 14, y is an integer less than or equal to 10, represent less than 10% of the weight of surfactants impregnating the microfiber fabric, better still less than 5% and even better still 0%.

Preferably, the wipe according to the invention does not comprise a dry Cémoi™ fabric impregnated with the Zonyl® FSO 100 surfactant.

The surfactant-impregnated fabric according to the invention is a woven or knitted, preferably knitted, microfiber fabric.

As is known, a woven material is obtained by perpendicularly interlacing two sets of yarns in the longitudinal (warp) direction and in the cross (weft) direction, whereas a nonwoven material is a manufactured sheet consisting of webs or laps of oriented or non-oriented fibers, bonded by friction, cohesion and/or adhesion.

A knitted fabric is obtained by looping one or more yarns in order to form stitches that are interlocked with one another.

According to the invention, use is preferably made of a knitted fabric with a number of stitches/cm$^2$ of at least 300, preferably at least 400, better still at least 500, even better still greater than 700. The optimal range for the number of stitches/cm$^2$ is greater than 800 and even better still greater than 900 stitches/cm$^2$. If necessary, a person skilled in the art will refer to the NF EN 14971 standard relating to this feature of the invention.

The fabric used in the invention preferably comprises at least 80% by weight of microfibers, better still at least 90% by weight of microfibers, preferably at least 95% by weight, better still 100% by weight of microfibers. The term "microfibers" is understood to mean textile fibers, the linear density of which is less than 1.3 decitex (1.3 g/10 km). The preferred microfibers have a linear density of less than 1 decitex.

The microfiber fabric comprises, according to the invention, hydrophilic polymer microfibers and lipophilic polymer microfibers.

The hydrophilic polymer microfibers have an affinity for water, whereas the lipophilic polymer microfibers have an affinity for oils.

The lipophilic polymer has affinities with sebum-type soiling, whereas the hydrophilic polymer has an affinity with respect to the moisture present at the surface of the substrate treated by the wipe, preferably an ophthalmic lens.

A hydrophilic polymer that is preferably used is a polymer capable of a degree of water uptake of greater than or equal to 2%, better still greater than or equal to 3%.

The degree of water uptake is the ratio between the conditioned weight of a sample (after 24 hours at 20° C. and a degree of ambient humidity of 65%) and the anhydrous weight obtained in an oven at 105° C.±2° C. (drying until a constant weight is obtained).

The water uptake measurement is known to a person skilled in the art who could refer, if necessary, to the EN ISO6741 standard.

It is preferable for the degree of water uptake of the hydrophilic polymer to be less than 10%, better still less than 8% and even better still less than or equal to 7%.

A lipophilic polymer that is preferably used has a degree of water uptake of less than 2%, better still less than 1.5% and even better still less than 1%.

The preferred hydrophilic polymers are polyamides 6,6 (degree of water uptake (DWU) of from 2.5% to 6%), polyamides 6 (DWU of 5.75%), and celluloses (DWU of from 8% to 13%).

The preferred lipophilic polymers are polyesters (DWU of from 0.15% to 0.50%) and polypropylenes (DWU of from 0.05% to 0.50%).

Although the wipes according to the invention contain large amounts of surfactants, the lipophilic/hydrophilic microfiber structure makes it possible to regulate the amount of surfactant deposited on the surface to be treated by avoiding a deposit excess that could give rise to a cosmetic defect that is unacceptable for the user.

The microfiber fabric preferably comprises polyamide microfibers and polyester microfibers, better still from 60% to 85% by weight of polyester microfibers and from 15% to 40% by weight of polyamide microfibers. An example of such a fabric is the Cémoi™ fabric, composed of 69.5% by weight of polyester microfibers and of 30.5% by weight of polyamide microfibers. A fabric composed of 79% by weight of polyester microfibers and of 21% by weight of polyamide microfibers, supplied by Kelnet, is also suitable.

Preferably, the microfiber fabric predominantly comprises microfibers of triangular cross section. Preferably, at least 80% by number of the lipophilic polymer microfibers have a triangular cross section.

The microfibers used in the invention may be obtained by splitting fibers, preferably having an "orange wedge" structure, the orange wedges preferably consisting of lipophilic polymer. Thus, according to one preferred embodiment, the microfibers are obtained from hydrophilic and lipophilic polymer fibers of composite structure, by splitting said composite structure, after weaving or knitting.

The invention also relates to a process for preparing a wipe as described above, comprising:
- the impregnation of a woven or knitted microfiber fabric by a solution comprising at least one solvent and at least one surfactant having a hydrophilic-lipophilic balance (HLB)≥5,
- the drying of the impregnated textile so as to eliminate said solvent.

The surfactant will generally be dissolved in an aqueous, alcoholic or aqueous-alcoholic solution, or even in another suitable organic solvent, in order to obtain a bath of surfactant typically containing 0.1% to 50%, preferably 1% to 10%, by weight of surfactant while avoiding forming micelle-type clusters. The impregnation step may be carried out by any suitable technique well known to a person skilled in the art, in particular by padding, spraying, dipping, or by using impregnating pads.

The drying step will generally consist of a thermal drying at a temperature ranging from 60° C. to 200° C., preferably from 80° C. to 150° C., intended to eliminate all or almost all of the solvent used in the surfactant composition for carrying out the impregnation while avoiding or limiting as much as possible the evaporation of the impregnated surfactant. At the end of this step, a wipe is obtained that is said to be dry, i.e. that feels dry to the touch, even though it is impregnated with surfactant and even though traces of solvent may optionally remain.

The dry wipes thus obtained are capable of effectively dispensing surfactant on the surface of a substrate, by simple wiping of the surface to be treated (back-and-forth translational and/or rotational movements), and this being carried out rapidly since the number of wiping actions necessary to obtain a durable anti-fog property is limited. It has furthermore been observed that a wipe according to the invention impregnated with 30% by weight of surfactant imparted anti-fog properties to glasses even after 3000 wiping operations.

The wipe may in addition retain its primary function, which is that of wiping the soiling on a substrate.

The present invention also relates to a process for imparting anti-fog properties to an article having a hydrophilic outer surface, comprising the application of a surfactant to said hydrophilic outer surface, by wiping this surface using a dry wipe as defined in the present description. The expression "hydrophilic surface" is understood to mean a surface having a static contact angle with water of less than 50°, preferably of less than 35°. According to the invention, the contact angles are measured in accordance with the method presented in patent application WO 2008/053020.

The hydrophilic outer surface treated by the wipe preferably comprises polyoxyalkylene groups, said surface having preferably been obtained by grafting at least one organosilane compound having a polyoxyalkylene group, comprising preferably less than 80 carbon atoms and at least one silicon atom bearing at least one hydrolyzable group.

This hydrophilic outer surface may in particular constitute a precursor coating of an anti-fog coating. The expression "precursor of an anti-fog coating" is understood to mean, in the present patent application, a coating which, if a liquid solution containing a surfactant is applied to its surface so as to form a film, constitutes an anti-fog coating. The assembly formed by the precursor coating and the film of surfactant-based solution constitutes the anti-fog coating proper. The expression "anti-fog coating" is understood to mean, in the present patent application, a coating which, when a transparent glass substrate coated with this coating is placed under conditions which bring about fogging on said substrate not equipped with said coating, presented in the experimental section in the paragraph "Hot steam test", immediately makes possible a visual acuity >6/10$^{th}$ for an observer observing, through the coated glass, a visual acuity scale located at a distance of 5 meters.

The obtaining of hydrophilic surfaces comprising grafted polyoxyalkylene groups and precursors of anti-fog coatings is described in detail in patent application WO 2011/080472. Such a surface may be obtained by application of a composition comprising a hydrolyzate of the organosilane compound having a polyoxyalkylene group (comprising preferably less than 80 carbon atoms) and at least one silicon atom bearing at least one hydrolyzable group. It is preferably a compound of formula:

$$R^1Y_mSi(X)_{3-m} \qquad (I)$$

wherein the Y groups, which are identical or different, are monovalent organic groups bonded to the silicon via a carbon atom, the X groups, which are identical or different, are hydrolyzable groups, $R^1$ is a group comprising a polyoxyalkylene functional group and m is an integer equal to 0, 1 or 2. Preferably, m=0. An example of such a compound is 2-[methoxy(polyethyleneoxy)propyl]trimethoxysilane having 6 to 9 ethylene oxide units, of formula CH$_3$O—(CH$_2$CH$_2$O)$_{6-9}$—(CH$_2$)$_3$Si(OCH$_3$)$_3$ (III).

The deposition of the organosilane compound having a polyoxyalkylene group and at least one silicon atom bearing at least one hydrolyzable group is preferably carried out in the gas phase, preferably by evaporation, followed by grafting.

Surfactants that are particularly well suited to imparting anti-fog properties to hydrophilic surfaces are polyoxyalkylene sorbitan fatty acid esters and polyethylene glycol alkyl monoethers, as defined above. These monoethers are preferably not fluorinated.

The application of the surfactant to the surface of the substrate, which preferably forms an anti-fog coating, generally lowers the static contact angle of this surface with water to 10° or less, preferably to 5° or less.

The invention also relates to a process for cleaning an article having a hydrophilic or hydrophobic outer surface, comprising the wiping of said surface using a dry wipe as defined in the present description. The expression "hydrophobic surface" is understood to mean a surface having a static contact angle with water of greater than or equal to 70°, preferably of greater than or equal to 90°. This type of surface cleans more easily using the impregnated dry wipes according to the invention, i.e. by carrying out a lower number of wiping operations in order to arrive at the same level of cleaning.

The cleaning process according to the invention is particularly suitable for cleaning an article having an outer surface that is soiled by sebum. In this cleaning process, the outer surface of the article preferably has a static contact angle with water of greater than or equal to 70°.

Surprisingly, it has been observed that the wipes according to the invention, although impregnated with a surfactant at concentrations that may be high, were capable of eliminating the soiling present on a surface, by wiping, while giving the treated surface long-lasting anti-fog properties, whereas the presence of the surfactant within the network of microfibers was expected to have a detrimental effect on the cleaning capacity of the wipe by limiting the access of the soiling to the microfibers. It has furthermore been observed that the cleaning performance of the impregnated dry wipes according to the invention was greater than that of the same wipes not impregnated with surfactant.

Surfactants that are particularly well suited to carrying out the cleaning of surfaces using wipes according to the invention are polyoxyalkylene sorbitan fatty acid esters and polyethylene glycol alkyl monoethers, as defined above, in particular when the surface to be cleaned is of hydrophilic nature. Preferably, the surfactant used for impregnating the wipes according to the invention with a view to the implementation of a process for cleaning a hydrophobic surface is not a fluorinated surfactant. Preferably, it is not, in this embodiment, a surfactant of formula $F(CF_2)_y-(CH_2-CH_2O)_{x+1}H$ (VIII), in which x is an integer varying from 1 to 14, y is an integer less than or equal to 10, the compounds of formula (VIII) for which y=6 representing at least 90% by weight of the compounds of formula (VIII) present in the composition. Preferably, it is not either, in this embodiment, a surfactant of formula $F(CF_2)_y-(CH_2-CH_2O)_{x+1}H$ (VIII), in which x is an integer varying from 2 to 14, y is an integer less than or equal to 10, the compounds of formula (VIII) for which y=6 representing at least 90% by weight of the compounds of formula (VIII) present in the composition.

The surfaces treated by the wipes according to the invention with a view to cleaning and/or obtaining anti-fog properties may be surfaces made of glass or plastic (organic or mineral glass), such as surfaces of optical devices (optical lenses, especially ophthalmic lenses, telescopes, cameras), mirrors, glazings in the building or motor vehicle field, etc.

As stated above, the processes of the invention exclude the use of a wipe comprising a dry microfiber fabric obtained by i) impregnation of a microfiber fabric comprising microfibers made of polymers or of mixtures of polymers comprising polyester units and polyamide units, with a surfactant composition containing at least one surfactant of formula $F(CF_2)_y-(CH_2-CH_2O)_{x+1}H$ (VIII), in which x is an integer varying from 1 to 14, y is an integer less than or equal to 10, the compounds of formula (VIII) for which y=6 representing at least 90% by weight of the compounds of formula (VIII) present in the composition, then ii) drying of this microfiber fabric, and exclude the use of a wipe comprising a dry microfiber fabric obtained by i) impregnation of a microfiber fabric comprising microfibers made of polymers or of mixtures of polymers comprising polyester units and polyamide units, with a surfactant composition containing at least one surfactant of formula $F(CF_2)_y-(CH_2-CH_2O)_{x+1}H$ (VIII), in which x is an integer varying from 2 to 14, y is an integer less than or equal to 10, the compounds of formula (VIII) for which y=6 representing at least 90% by weight of the compounds of formula (VIII) present in the composition, then ii) drying of this microfiber fabric.

The invention also relates to an assembly comprising a wipe as described in the present description and a pair of spectacles comprising lenses having a substrate, the outer surface of which has a static contact angle with water of less than 50°. This substrate is preferably coated with a precursor coating of an anti-fog coating, having a static contact angle with water of less than 50°, obtained by grafting at least one compound having a polyoxyalkylene group. As has been seen above, this compound is preferably an organosilane compound comprising less than 80 carbon atoms, and comprising at least one silicon atom bearing at least one hydrolyzable group.

The following examples illustrate the invention in more detail but without implied limitation.

EXAMPLES

1. Materials and Optical Articles Used

The wipes used in the examples consist of Cémoi™ fabric, manufactured by KB Seiren and sold by Facol in non-impregnated form under the reference Microfibre M8405 30×40 (160 g/m², EN 12127 standard). The Cémoi™ fabric is composed of 69.5% polyester (PES) and of 30.5% polyamide (ISO 1893 standard). Its various characteristics are the following: thickness: 0.56 mm (ISO 5084 standard), density: 284 kg/m³, interlock bonding, E44 gauge, 900 stitches/cm² (NF EN 14971 standard), number of stitches/cm: 30.5 in the columns and 29.5 in the rows (NF EN 14971 standard), yarn length (stitch length) per 100 stitches: 14 cm (NF EN 14970 standard), main yarn count: 56.1 dtex (NF G 07 316 standard), number of sectional filaments or microfibers ≥200 PES filaments (yarn of 25 two-component strands: 8 PES filaments per strand), geometry of the strand: two-component fiber of Pie Wedge type (16 segments), mean diameter of the microfibers: 6.5 μm, triangular PES microfibers (SEM microscope).

Impregnated wipes of 12 cm×15 cm format were prepared from samples of various microfiber textiles that were subjected to a single bath padding operation to carry out the impregnation thereof, then to a thermal drying for 3 minutes in an oven at 120° C. This technique, which comprises a step of pressing the textile between rolls after the impregnation thereof in an aqueous solution of surfactant, enables a deep impregnation and prevents the textile from dripping at the end of its treatment. The baths of surfactants comprised 5% by weight of surfactant in a solution comprising a deionized water/isopropyl alcohol mixture at 80/20 by volume.

The various surfactants that have been evaluated are the following:

a) Zonyl® FSO 100 (CAS No. 65545-80-4, DuPont) is a mixture of compounds of formula (VIII) in which y takes the values 6, 8 and 10 in the respective weight proportions of the order of 65%, 30% and 5% and x is an integer varying from 2 to 13.

b) Tween® 40, or polyoxyethylene (20) sorbitan monopalmitate (CAS No. 9005-66-7), is a compound of formula X (represented above) in which $R'=C_{15}H_{31}$ and w+x+y+z=20.

c) Brij® C10 (formerly Brij® 56) or polyethylene glycol hexadecyl ether (CAS No. 9004-95-9, ICI), is a compound of formula $H(OCH_2CH_2)_nOR^1$ (IV) in which n~10 and $R^1$=n-$C_{16}H_{33}$.

Three types of lenses were used. The lenses denoted by A are identical to those described in the experimental section of patent application WO 2012/153072 and comprise, as outer layer, a precursor coating of anti-fog coating based on the siloxane compound 2-[methoxy(polyethyleneoxy)propyl]trimethoxysilane having 6 to 9 ethylene oxide units of formula III and a molar mass of 450-600 g/mol (CAS No.: 65994-07-2, Ref: SIM6492.7, supplied by Gelest, Inc.), apart from the fact that here these are ophthalmic lenses having a radius of curvature from 80 mm to 180 mm with no power (same radius of curvature on convex and concave face) (referred to as flat lenses) and that, at the end of the evaporation of the compound of formula III, the surface of each lens was wiped with a dry Cémoi fabric until the surplus siloxane compound of formula III deposited is carried away (as described in patent application WO 2011/080472). The precursor coatings of anti-fog coating that are obtained have a thickness of 1-3 nm.

The lenses denoted by B are identical to the lenses A, with the exception of their outer layer which is an anti-soiling coating having a thickness of 2 to 3 nm obtained by vacuum evaporation of the compound OF210™ sold by Optron (instead of a precursor of anti-fog coating).

The lenses denoted by C are identical to the lenses A, with the exception of their outer layer which is an anti-soiling coating having a thickness of 3 nm obtained by vacuum evaporation of the compound Optool DSX™ sold by Daikin Industries (instead of a precursor of anti-fog coating).

2. Evaluation of the Anti-Fog Properties of the Wipes According to the Invention a) Protocol for Applying the Surfactant to the Surface of the Lenses by Wiping Using a Surfactant-Impregnated Wipe The lenses used in the anti-fog tests are lenses A, having a hydrophilic surface. The lenses are firstly cleaned carefully with a soapy water solution then wiped with a dry Cémoi™ fabric. Secondly, both faces of the lenses are wiped with a wipe made of Cémoi™ fabric that is impregnated with surfactant (30% by weight) by carrying out a spiral movement from the center toward the edge with the wipe, so as to "load" them with surfactant. This corresponds to one application. Various levels of application may be carried out, for example 5, 10 or 20 applications.

b) Hot Steam Test

All the steam tests were carried out on a panel of 5 lenses treated with a wipe impregnated with 30% of surfactant by weight. Before the test, the lenses are placed in an environment regulated in temperature (20-25° C.) and at 40% to 50% humidity for 24 hours. The lenses are then placed for 15 seconds above a heated receptacle containing water at 52° C. Immediately after, a scale of visual acuity located at 5 m is observed through the lens tested. The observer evaluates the visual acuity as a function of the time and according to the following criteria:

0. No fogging, no visual distortion (visual acuity=10/10$^{th}$)
1. Fogging and/or visual distortion allowing a visual acuity >6/10$^{th}$
2. Fogging and/or visual distortion allowing a visual acuity <6/10$^{th}$ In practical terms, in order to obtain the grade 0 or 1, a wearer having 10/10 vision and having the lens placed in front of his eye, has to be capable of distinguishing the orientation of the letters "E" on the 6/10 line of the Snellen Optotype chart placed at 5 meters.

This test makes it possible to simulate the conditions of ordinary life where a wearer places his face above his tea, coffee or a saucepan of boiling water. If the lenses obtain a grade of 0 or 1, it is verified under a Waldmann lamp that they are completely dry, then the steam test is repeated.

The stability over time of the anti-fog coating was also evaluated, at a rate of one fogging operation per day. During the waiting time, the lenses are stored at ambient temperature in a box. The results are presented in the table below:

| Fabric | | Number of applications of the surfactant | | | Resistance over time of one application | | | | | |
|---|---|---|---|---|---|---|---|---|---|---|
| Cémoi™ | Surfactant | 5 | 10 | 15 | D + 1 | D + 2 | D + 3 | D + 4 | D + 5 | D + 6 |
| Cémoi™ | Tween 40 | 0 | — | — | 0 | 1 | 1 | — | — | 2 |
| Cémoi™ | Brij C10 | 0 | — | — | 0 | 0 | 1 | — | — | 2 |

It is observed that a small number of applications of surfactant makes it possible to benefit from anti-fog properties.

c) Tests Under Tropical and Winter Conditions

These tests were carried out by using the system for determining the anti-fog performance of a transparent optical article that is described in detail in patent application FR 2974904 and that is represented in FIG. 1 of this patent application, where it is numbered (20). A lens passes the test when it obtains a clarity coefficient N≥0.6. On the other hand, a lens fails this test when it obtains a clarity coefficient N<0.6. The clarity coefficient N is defined in patent application FR 2974904.

Winter Conditions

The lenses were stored for 60 minutes under "winter" conditions (at 0° C. or −10° C.) and then rapidly subjected to normal conditions (20° C., 50% humidity). The results are presented in the table below:

| Fabric | Surfactant | 0° C. | −10° C. |
|---|---|---|---|
| Cémoi™ | Tween 40™ | Success for 3/3 lenses | Success for 3/3 lenses |
| Cémoi™ | Brij C10™ | Success for 2/3 lenses | Not tested |

Tropical Conditions

The lenses were stored for 30 minutes under normal conditions (20° C., 45% humidity) and then rapidly subjected to "tropical" conditions (30° C., 70% humidity). All the lenses tested passed these tests (surfactants evaluated: Tween 40 and Brij C10).

3. Evaluation of the Cleaning Properties of the Wipes According to the Invention a) Description of the Cleanability Test The test is carried out in a room regulated in temperature at 22° C.±3° C. and at a degree of ambient humidity of 50%±10%. The lenses are firstly cleaned carefully with a soapy water solution, then rinsed with isopropyl alcohol, then with deionized water and finally wiped with a dry Cémoi™ fabric. Secondly, an artificial soiling mark is deposited in the form of concentric circles or grooves by pad printing on the convex surface of the lenses, equipped with an anti-soiling coating (lenses B and C) or with a precursor of anti-fog coating (spectacle lenses A), so as to achieve a haze H~8-9 for all the lenses (namely two deposits for the hydrophilic surface (spectacle lenses A) and the spectacle lenses B, the surface of which was treated with OF210™ and 3 to 4 deposits for the surface treated with Optool DSX™ (spectacle lenses C). The artificial soiling (artificial sebum) used in this test comprises, as main constituent, oleic acid and is in the form of a 20 mm diameter mark.

The lenses are then subjected to automatic wiping with the aid of the impregnated microfiber fabric to be evaluated, attached to a mechanical robot, under a load of 750 g (perfectly reproducible back-and-forth movement). One wiping operation corresponds to one forward movement or one backward movement of the fabric. The total travel during the movement of the fabric on the lens is 40 mm, i.e. 20 mm on either side of a point centered on the soiling. The textile to be evaluated is always applied in the same direction against the lens. The movement starts from the center during the $1^{st}$ movement and the value of 2 which is mentioned during the very first displacement is in fact 1.5.

50% is obtained when the number of operations carried out makes it possible to divide by 2 the initial haze measured after application of the artificial soiling (~8-9).

The haze H is obtained in accordance with the ASTM D1003 standard "Standard test method for haze and luminous transmittance of transparent plastics" by simultaneously measuring the total amount of light transmitted by the lens (I total) and the amount of scattered light, in transmission (I scattered: amount of light transmitted and deflected by an angle of greater than 2.5° relative to the normal direction):

$$H(\%) = \frac{I \text{ scattered}}{I \text{ total}} \times 100$$

The cleanability test makes it possible in particular to determine the number of wiping operations necessary to establish a haze H of less than or equal to 0.5%, which corresponds to a satisfactory level of cleanliness of the glass.

b) Exemplary Embodiments of Wipes According to the Invention for Cleaning Lenses Having Various Surface Properties b.1) Examples on a Hydrophilic Surface The lenses used for this test are the lenses A, comprising, as outer layer, a precursor of anti-fog coating (hydrophilic outer layer). The results are presented in the table below and, as regards the haze, also in the form of histograms in FIG. 1.

| Lenses A | Number of operations | | | | | | | | | | | |
|---|---|---|---|---|---|---|---|---|---|---|---|---|
| | 0 | 2 | 5 | 10 | 20 | 30 | 0 | 2 | 5 | 10 | 20 | 30 |
| | Haze (%) | | | | | | % wiping efficiency | | | | | |
| Cémoi ™ wipe not impregnated (comparative) | 8.7 | 4.3 | 1.7 | 0.6 | 0.3 | 0.3 | 0.0 | 50.6 | 80.5 | 93.1 | 96.6 | 96.6 |
| Cémoi ™ wipe + 30% Brij C10 ™ | 8.8 | 4.0 | 1.1 | 0.3 | 0.2 | 0.2 | 0.0 | 54.6 | 87.8 | 96.2 | 97.7 | 98.3 |
| Cémoi wipe + 30% Tween 40 ™ | 8.8 | 2.5 | 0.5 | 0.2 | 0.2 | 0.1 | 0.0 | 72.0 | 94.0 | 97.5 | 98.2 | 98.4 |
| Cémoi ™ wipe + 15% Zonyl FSO 100 ™ | 9.0 | 2.6 | 0.4 | 0.2 | 0.1 | 0.1 | 0.0 | 70.9 | 95.2 | 98.3 | 99.1 | 99.2 |
| Cémoi ™ wipe + 30% Zonyl FSO 100 ™ | 9.0 | 2.1 | 0.3 | 0.1 | 0.1 | 0.1 | 0.0 | 77.1 | 97.0 | 98.7 | 99.2 | 99.3 |

The value of the haze in transmission (denoted by H) through the lens is measured with a Hazeguard XL 211 Plus device, first measurement carried out at the center of the lens over the zone of the sebum groove, then after a number of wiping operations equal to 2, 5, 10, 20 or 30. For each type of textile, the value indicated in the measurement tables below is a mean of measurements carried out on three lenses, each initially soiled as indicated above and that are successively subjected to the wiping cycle 2, 5, 10, 20, 30 (the values mentioned are accumulated values from the start of the wiping operations), retaining the same fabric for the three lenses. The tables also indicate the (cumulative) percentage of wiping efficiency after each number of applied operations. Thus, by way of example, a wiping efficiency of It is observed that the wipes according to the invention exert a considerably greater cleaning action on a hydrophilic surface (lens A) than the same wipe not loaded with surfactants and that Tween 40 and Zonyl FSO 100 perform better than Brij C10.

b.2) Cleanability of a Hydrophobic Surface

The lenses used for this test are the lenses B and C, comprising, as outer layer, an anti-soiling coating (hydrophobic outer layer). The results are presented in the tables below and, as regards the haze, also in the form of histograms in FIG. 2 (lenses B) and FIG. 3 (lenses C):

| | Number of operations | | | | | | | | | | |
|---|---|---|---|---|---|---|---|---|---|---|---|
| | 0 | 2 | 5 | 10 | 20 | 30 | 0 | 2 | 5 | 10 | 20 | 30 |
| | Haze (%) | | | | | | % wiping efficiency | | | | | |
| Lenses B | | | | | | | | | | | | |
| Cémoi™ wipe not impregnated (comparative) | 8.3 | 1.9 | 0.3 | 0.1 | 0.1 | 0.0 | 0.0 | 77.7 | 96.5 | 98.7 | 99.2 | 99.5 |
| Cémoi™ wipe + 30% Brij C10™ | 8.0 | 0.7 | 0.2 | 0.1 | 0.1 | 0.1 | 0.0 | 91.3 | 97.8 | 98.6 | 99.0 | 98.9 |
| Cémoi™ wipe + 30% Tween 40™ | 7.7 | 0.7 | 0.1 | 0.1 | 0.1 | 0.1 | 0.0 | 91.0 | 98.1 | 98.5 | 98.6 | 98.3 |
| Lenses C | | | | | | | | | | | | |
| Cémoi™ wipe not impregnated (comparative) | 8.2 | 0.4 | 0.2 | 0.1 | 0.1 | 0.1 | 0.0 | 95.3 | 97.8 | 98.7 | 99.2 | 99.2 |
| Cémoi™ wipe + 30% Brij C10™ | 8.0 | 0.3 | 0.2 | 0.1 | 0.1 | 0.1 | 0.0 | 96.2 | 97.3 | 98.6 | 98.3 | 98.5 |
| Cémoi™ wipe + 30% Tween 40™ | 7.9 | 0.2 | 0.1 | 0.1 | 0.1 | 0.1 | 0.0 | 97.8 | 98.3 | 98.6 | 98.2 | 98.3 |

It is observed that, on the hydrophobic surfaces B and C, the wipes according to the invention comprising Tween 40 and Brij C10 surfactants improve the cleaning performances of the wipe.

The invention claimed is:

1. A dry wipe comprising a woven or knitted microfiber fabric impregnated with at least one surfactant, wherein:
   the surfactant is a polyethoxylated surfactant of fluoroalkyl nature and has a hydrophilic-lipophilic balance (HLB)≥5; and
   the microfiber fabric comprises hydrophilic polymer microfibers and lipophilic polymer microfibers;
the wipe not comprising a dry microfiber fabric obtained by i) impregnation of a microfiber fabric comprising microfibers made of polymers or of mixtures of polymers comprising polyester units and polyamide units, with a surfactant composition containing at least one surfactant of formula $F(CF_2)_y$—$(CH_2$—$CH_2O)_{x+1}H$ (VIII), in which x is an integer varying from 1 to 14 or x is an integer varying from 2 to 14, y is an integer less than or equal to 10, the compounds of formula (VIII) for which y=6 representing at least 90% by weight of the compounds of formula (VIII) present in the composition, then ii) drying of this microfiber fabric.

2. The wipe as claimed in claim 1, wherein the surfactant contains at least one Si—O siloxane unit and has a surface tension of less than 40 nN/m.

3. The wipe as claimed in claim 1, wherein the surfactant has a hydrophilic-lipophilic balance (HLB)≤18.

4. The wipe as claimed in claim 1, wherein the woven or knitted microfiber fabric comprises polyamide microfibers and polyester microfibers.

5. The wipe as claimed in claim 1, wherein the surfactant comprises a polyoxyalkylene group.

6. The wipe as claimed in claim 5, wherein the surfactant comprises a polyoxyethylene group.

7. The wipe as claimed in claim 6, wherein the polyoxyethylene group comprises more than 6 oxyethylene units.

8. The wipe as claimed in claim 1, wherein the wipe comprises from 5% to 40% by weight of impregnated surfactants relative to the weight of the microfiber fabric not impregnated with said at least one surfactant.

9. The wipe as claimed in claim 1, wherein the wipe comprises at least 5% by weight of impregnated surfactants relative to the weight of the microfiber fabric not impregnated with said at least one surfactant.

10. The wipe as claimed in claim 9, wherein the wipe comprises from 15% to 35% by weight of impregnated surfactants relative to the weight of the microfiber fabric not impregnated with said at least one surfactant.

11. The wipe as claimed in claim 1, wherein the woven or knitted microfiber fabric comprises at least 90% by weight of microfibers.

12. The wipe as claimed in claim 11, wherein the woven or knitted microfiber fabric comprises at least 95% by weight of microfibers.

13. The wipe as claimed in claim 12, wherein the woven or knitted microfiber fabric comprises 100% by weight of microfibers.

14. The wipe as claimed in claim 1, wherein the hydrophilic polymer microfibers and lipophilic polymer microfibers are obtained from hydrophilic and lipophilic polymer fibers of composite structure, by splitting said composite structure, after weaving or knitting.

15. The wipe as claimed in claim 1, wherein the woven or knitted microfiber fabric is knitted and has a number of stitches per cm$^2$ of greater than or equal to 300.

16. The wipe as claimed in claim 1, wherein the microfiber fabric comprises from 60 to 85% by weight of polyester microfibers and from 15 to 40% by weight of polyamide microfibers.

17. A process for preparing a wipe as claimed in claim 1, comprising:
   the impregnation of a woven or knitted microfiber fabric by a solution comprising at least one solvent and at least one surfactant having a hydrophilic-lipophilic balance (HLB)≥5; and
   the drying of the impregnated textile so as to eliminate said solvent.

18. A process for imparting anti-fog properties to an article having an outer surface having a static contact angle with water of less than 50°, comprising the application of at least one surfactant to said outer surface, by wiping this surface using a dry wipe, comprising a woven or knitted microfiber fabric impregnated with said at least one surfactant, wherein the surfactant has a hydrophilic-lipophilic balance (HLB)≥5, and the microfiber fabric comprises hydrophilic polymer microfibers and lipophilic polymer microfibers;
   the wipe not comprising a dry microfiber fabric obtained by i) impregnation of a microfiber fabric comprising microfibers made of polymers or of mixtures of polymers comprising polyester units and polyamide units, with a surfactant composition containing at least one surfactant of formula $F(CF_2)_y$—$(CH_2$—$CH_2O)_{x+1}H$ (VIII), in which x is an integer varying from 1 to 14 or x is an integer varying from 2 to 14, y is an integer less than or equal to 10, the compounds of formula (VIII) for which y=6 representing at least 90% by weight of the compounds of formula (VIII) present in the composition, then ii) drying of this microfiber fabric.

19. The process as claimed in claim 18, wherein the outer surface of said article comprises polyoxyalkylene groups, said surface having been obtained by grafting at least one organosilane compound having a polyoxyalkylene group and at least one silicon atom bearing at least one hydrolyzable group.

20. The process as claimed in claim 19, wherein said polyoxyalkylene group comprises less than 80 carbon atoms.

21. The process as claimed in claim 18, wherein the surfactant is a polyoxyalkylene sorbitan fatty acid ester or a polyethylene glycol alkyl monoether.

22. A process for cleaning an article having an outer surface, comprising the wiping of said outer surface using a dry wipe as defined in claim 1, said wipe comprising said woven or knitted microfiber fabric impregnated with said surfactant.

23. The process as claimed in claim 22, wherein the outer surface of the article has a static contact angle with water of greater than or equal to 70°.

24. The process as claimed in claim 22, wherein the surfactant is a polyoxyalkylene sorbitan fatty acid ester or a polyethylene glycol alkyl monoether.

25. An assembly comprising a dry wipe and a pair of spectacles comprising lenses having a substrate, the outer surface of which has a static contact angle with water of less than 50°, the dry wipe comprising a woven or knitted microfiber fabric impregnated with at least one surfactant, wherein the surfactant has a hydrophilic-lipophilic balance (HLB)≥5, and the microfiber fabric comprises hydrophilic polymer microfibers and lipophilic polymermicrofibers;

the wipe not comprising a dry microfiber fabric obtained by i) impregnation of a microfiber fabric comprising microfibers made of polymers or of mixtures of polymers comprising polyester units and polyamide units, with a surfactant composition containing at least one surfactant of formula $F(CF_2)_y—(CH_2—CH_2O)_{x+1}H$ (VIII), in which x is an integer varying from 1 to 14 or x is an integer varying from 2 to 14, y is an integer less than or equal to 10, the compounds of formula (VIII) for which y=6 representing at least 90% by weight of the compounds of formula (VIII) present in the composition, then ii) drying of this microfiber fabric.

26. The assembly as claimed in claim 25, wherein the substrate is coated with a precursor coating of an anti-fog coating, having a static contact angle with water of less than 50°, obtained by grafting at least one compound having a polyoxyalkylene group.

27. The assembly as claimed in claim 26, wherein said polyoxyalkylene group is polyoxyethylene group.

28. The assembly as claimed in claim 26, wherein the compound having a polyoxyalkylene group is an organosilane compound.

29. The assembly as claimed in claim 28, wherein said organosilane satisfies the following two conditions:
- the organosilane compound comprises less than 80 carbon atoms; and
- the organosilane compound comprises at least one silicon atom bearing at least one hydrolyzable group.

* * * * *